United States Patent [19]

Bennett

[11] 4,229,329

[45] Oct. 21, 1980

[54] FIRE RETARDANT COATING COMPOSITION COMPRISING FLY ASH AND POLYMER EMULSION BINDER

[76] Inventor: Herbert Bennett, 260 Lenox Rd., Apt. 2A, Brooklyn, N.Y. 11226

[21] Appl. No.: 12,514

[22] Filed: Feb. 15, 1979

Related U.S. Application Data

[63] Continuation-in-part of Ser. No. 831,407, Sep. 8, 1977, abandoned.

[51] Int. Cl.³ .................................................. C08L 1/28
[52] U.S. Cl. ........................... 260/17 R; 106/DIG. 1; 106/287.35; 260/42.15; 260/42.55; 264/DIG. 49
[58] Field of Search ................ 260/17 R; 106/DIG. 1

[56] References Cited

U.S. PATENT DOCUMENTS

| | | | |
|---|---|---|---|
| 2,516,342 | 7/1950 | Randall | 106/DIG. 1 |
| 3,819,556 | 6/1974 | Morisawa | 260/29.6 PS |
| 4,147,687 | 4/1979 | O'Donnell | 106/DIG. 1 |

OTHER PUBLICATIONS

Chem. Abst. 79: 67907a, Acrylic Resin Dispersions-Coating-Materials, Morisawa.
Chem. Abst. 89: 45178t, Anticorrosion Coating Compositions, Kubota.

*Primary Examiner*—Edward M. Woodberry
*Attorney, Agent, or Firm*—Robert E. Burns; Emmanuel J. Lobato; Bruce L. Adams

[57] ABSTRACT

A fire retardant coating composition useful as a paint or as a mastic is composed of ultrafine pulverized fly ash, a low viscosity vinyl acrylic type emulsion polymer as a binder and water. The composition also preferably contains one or more of a dispersant, a defoamer, a plasticizer, a thickener, a drying agent, preservative, a fungicide and an ingredient to control the pH of the composition and thereby inhibit corrosion of any metal surface to which the composition is applied.

7 Claims, No Drawings

FIRE RETARDANT COATING COMPOSITION COMPRISING FLY ASH AND POLYMER EMULSION BINDER

REFERENCE TO PRIOR APPLICATION

This application is a continuation-in-part of my application Ser. No. 831,407 filed Sept. 8, 1977 now abandoned.

FIELD OF INVENTION

The present invention relates to fire retardant compositions and particularly to coating compositions useful as a protective paint or mastic.

BACKGROUND OF THE INVENTION

Fire has always presented a serious problem to buildings. The fire losses each year are tremendous and this keeps fire insurance rates high. Many construction materials that are commonly used such as wood, composition board and paint are not fireproof or even fire resistant. Even buildings that are constructed of materials such as steel, concrete, brick and stone and are so called "fireproof" have flamable materials in the interior construction and hence may be gutted by a fire. Materials that are fireproof or fire resistant are generally more expensive than those which are not and this limits their use. Moreover, asbestos which has heretofore been used as a fireproof material has been found to present serious health problems to workers engaged in the production of asbestos products and this restricts its use.

Another problem that has become more and more serious is the pollution of the atmosphere. The demand for energy is continually increasing and although some energy is produced by water power and nuclear power plants, reliance is still placed mainly on fossil fuels. With the decreasing supply and increasing cost of natural gas and petroleum, power plants are forced to resort to the burning of coal. This causes a serious ecological problem since the combustion of coal produces not only noxious gases but also finely divided solid material and in particular fly ash. While such solid particles can be separated from flue gases by electrostatic filters, this involves additional expense and the problem remains of disposing of the solids collected.

SUMMARY OF THE INVENTION

The present invention contributes materially to the solution of both of the foregoing problems. In accordance with the invention an effective fire retardant composition is composed basically of fly ash, a flame resistant vinyl acrylic type polymer emulsion binder and water. The fire resistant composition in accordance with the invention is useful as a paint which can be applied to wood or metal surfaces to provide a protective coating. The composition, with a lower percentage of water, is also useful as a mastic for covering surfaces, in particular metal surfaces, to provide protection from fire. The compositions may be used on both interior and exterior structures.

The invention thus contributes to protection from fire and also contributes to improvement of the ecology by providing a valuable use for fly ash. This relieves the problem of disposing the fly ash as a waste material and also helps defray the expense of removing fly ash and other atmosphere contaminants from flue gases.

The fire retardant composition in accordance with the present invention consists basically of ultrafine pulverized fly ash, a heat resistant synthetic latex binder and sufficient water for rendering the composition sufficiently fluid for application to a surface as a paint or coating, for example by brushing, rolling, spraying or trowelling. The composition can also be mixed with fibrous or other filler for making composition board, tiles, shingles, etc. The term "fluid" is herein used in a broad sense to indicate that the composition is capable of flowing and embraces a wide range of viscosities.

The fly ash is of the kind recovered from flue gases in the combustion of coal and is preferably of a fineness to pass through a 180 mesh screen. If the fly ash as recovered from the flue gas contains larger particles, these are screened out or the fly ash is pulverized, for example in a ball mill, to reduce the particle size. If the fly ash recovered from the flue gas contains combustible particles, for example unburned carbon, they are burned out or otherwise removed. The ultrafine fly ash is the basic component of the composition and preferably comprises 24-50% of the composition by weight. In some cases it has been found desirable to include in addition to the fly ash lightweight inert inorganic material such as gypsum or fibreglass in the form of fine flakes or fibres. For example in making mastic or composition board, the fibreglass flakes or fibres, because of their low density, contribute to making a strong fire resistant lightweight product. Moreover, in some applications where it is desired to reduce weight and cost, organic filler such as paper pulp can be used in an amount up to about 10% by weight.

The binder used is a low viscosity vinyl acrylic type emulsion polymer having the properties of being stable and compatible with fire retardant ingredients and of forming a film which is tough and flexible and resistant to cracking and which has outstanding permanence, durability, adhesion and binding capacity. Moreover, the binder is flame resistant and is virtually smokeless and free of emission of toxic vapors when heated. The amount of binder used is 24-50% of the composition by weight. A binder that has been found satisfactory is Rhoplex AC-234 which is a 100% acrylic emulsion polymer produced by Rohm & Haas Co. It is designed to give excellent outdoor durability and excellent adhesion under damp or dry conditions. Moreover, coating compositions made with Rhoplex AC-234 are easily applied and dry rapidly to produce films with extended flexibility and excellent resistance to blistering, grain-cracking and flaking. Another binder that has been found eminently satisfactory is UCAR Latex 5000 which is a vinyl acrylic type polymer which is flame resistant, virtually smokeless and does not produce toxic vapors when heated. UCAR Latex 5000 is produced by Union Carbide Corporation. The binder is used in the amount of 7-31% by weight of the composition depending on other ingredients and the purpose of which the composition is to be used.

The thinner used in the composition is water, which may constitute from 8-48% by weight of the composition depending on the use to which the composition is to be put. For example if the composition is to be used as a paint, sufficient water is included to provide proper flow characteristics for application, for example by brushing or spraying. If, on the other hand, the composition is to be used as a mastic, less water is used.

In addition to the basic ingredients described above, the composition preferably contains one or more of the following additives, namely inorganic pigment, a dispersant, a defoamer, a plasticizer, a thickener, a drying agent, a preservative, a fungicide and an agent for controlling the pH of the composition so as to inhibit corrosion when the composition is applied to a metal surface.

As the fly ash is gray in color, an inorganic pigment can be added when other colors are desired. A suitable pigment is titanium dioxide (TiO$_2$ R900) which is a conventional white pigment and hence lightens the color of the composition. For example the TiO$_2$ can be used in an amount of for example 1–10% by weight of the composition. Additional or other pigments can be used when other colors are desired.

To assist in dispersing the fly ash and any pigment in the binder and the water, it is desirable to use a water-compatible dispersant such for example as Tamol 731 (25%) produced by Rohm & Haas Co. or Nalco 7 SJ-013 produced by Nalco Chemical Company. The amount of dispersant used is preferably in the range of 0.1% to 5% by weight.

In order to prevent foaming of the composition when it is being mixed, it is desirable to use a water-compatible defoamer such for example as Nalco 2342 or Nalco 6 SJ-899 both produced by Nalco Chemical Company or Nopco NXZ produced by the Process Chemicals Division of Diamond Shamrock Corporation. Nalco 2342 is a liquid antifoam agent that is water soluble at normal room temperatures and becomes insoluble as temperature increases. Nalco 6 SJ-899 is a non-silicone containing antifoam agent suitable for a wide range of resin systems. It is a cream white liquid. Nopco NXZ is a 100% active liquid defoamer used in synthetic latex emulsions. In appearance it is a hazy amber liquid. The amount of defoamer used may vary from 0.3–12% by weight.

In order to increase the plasticity and flexibility of the composition, it is desirable to use a plasticizer such as Texanol produced by Eastman Chemical Products Inc. The composition of Texanol is 2,2,4-trimethyl-1,3-pentanediol monoisobutyrate. Another suitable plasticizer is tricresyl phosphate. Depending on the application for which the composition is to be used, the amount of plasticizer may vary from 0.2–1% by weight.

For some applications where a thicker composition is desired, a thickener such as Cellosize QP15000 produced by Union Carbide Corporation can be used. Cellosize is hydroxyethyl cellulose produced by reacting alkali treated cellulose with ethylene oxide under carefully controlled conditions. The amount of thickener used may vary from 0.1–1.0% by weight.

It is also desirable to use a drying agent to expedite the drying of the composition. Suitable drying agents are Nalcoag 1034-A and Nalcoag 1050 both produced by Nalco Chemical Company. Nalcoag 1034-A is an acidic pH aqueous colloidal silica dispersion which is relatively non-toxic. Nalcoag 1050 is a colloidal dispersion of submicron size silica particles in the form of tiny spheres. Sodium silicate can also be used as a drying agent. The amount of drying agent used may vary from 0.1–6% by weight.

In order to increase the shelflife of the composition it is desirable to include a preservative such as Dowicil 75 produced by the Dow Chemical Company. Dowicil 75 is 1-(3-chloroallyl)-3,5,7-triaza-1-azoniaadamantane chloride to which a stabilizer (sodium bicarbonate) has been added. The amount of preservative used may vary from 0.1–1.0%.

Inasmuch as the composition is water base, it is desirable to include a fungicide to inhibit the growth of any fungi in the composition. A suitable fungicide is Nopcocide N-96 produced by Diamond Shamrock Corporation. The chemical composition of Nopcocide N-96 is 2,4,5,6-tetrachloroisophthalonitrile. The amount of fungicide used may vary from 0.1–1.0%.

It is also desirable, especially when the composition is to be used on a metal surface, to include an agent for controlling and stabilizing the pH of the composition. A suitable neutralizing agent is AMP-95 produced by the NP Division of IMC Chemical Group, Inc. AMP-95 is the product name for 2-amino-2-methyl-1-propanol that contains 5% added water. This is a colorless, mobile liquid with a relatively low viscosity which remains liquid at temperatures as low as 4° C. The amount of neutralizing agent used may vary from 0.2–1% by weight.

It has also been found desirable to include in the composition about 20–30% by weight of amorphous silica which acts as a filler and smoke suppressant. A product that has been found satisfactory in this regard is amorphous silica 1240 produced by Illinois Minerals Co.

It has also been found desirable to include in the composition a nonionic surfactant such as Igepal CO-630 produced by GAF Corporation. The chemical composition of Igepal CO-630 is nonylphenoxypoly-(ethyleneoxy)ethanol. The amount of surfactant included in the composition may vary from about 0.2–1%. It has been found particularly useful when the composition is to be used as a paint as it aids brushing.

The following non-limiting examples are illustrative of fire retardant compositions in accordance with the invention:

EXAMPLE 1

| | |
|---|---|
| H$_2$O | 30–40% |
| Cellosize QP 1500 | 0–0.5% |
| Tamol 731 (25%) | 1–5% |
| Nopocide N96 | 0–0.9% |
| Nopco NXZ | 0–0.9% |
| TiO$_2$ | 2–10% |
| PFA | 40–50% |
| Rhoplex AC234 | 16–20% |
| Texanol | 0–0.9% |
| Sodium Silicate | 1–5% |
| Colloidal Silica 1034 | 1–5% |
| Dowicil 75 | 0–0.5% |

EXAMPLE 2

| | |
|---|---|
| H$_2$O | 28–40% |
| Cellosize QP 15000 | 0.2–0.5% |
| Nalco 7SJ-013 | 0.1–0.7% |
| Nopcocide N96 | 0.1–0.7% |
| Nalco 2342 | 1–4% |
| TiO$_2$ | 4–9% |
| PFA | 38–47% |
| UCAR Latex 5000 | 11–21% |
| Texanol | 0.2–0.9% |
| Sodium Silicate | 2–6% |
| Colloidal Silica 1050 | 2–6% |
| Dowicil 75 | 0–0.4% |

EXAMPLE 3

| | |
|---|---|
| H$_2$O | 30–42% |
| Cellosize QP 15000 | 0.2–0.6% |
| Nalco 7SJ-013 | 0.1–0.4% |
| Nopocide N96 | 0.2–0.6% |

EXAMPLE 3-continued

| | |
|---|---|
| Nalco 6SJ-899 | 5-9% |
| TiO$_2$ R900 | 1-7% |
| PFA | 30-38% |
| UCAR Latex 5000 | 11-21% |
| Texanol | 0.3-0.8% |
| Colloidal Silica 1050 | 1.7-2.6% |
| Dowicil 75 | 0-0.5% |

EXAMPLE 4

| | |
|---|---|
| H$_2$O | 36-48% |
| Cellosize QP 15000 | 0.2-0.6% |
| Nalco 7SJ-013 | 0.1-0.4% |
| Nopcocide N96 | 0-0.3% |
| Nalco 6SJ-899 | 1-9% |
| TiO$_2$ | 3-9% |
| PFA | 36-44% |
| UCAR Latex 5000 | 7-16% |
| Texanol | 0.2-0.7% |
| Colloidal Silica 1034A | .1-.5% |
| Dowicil 75 | 0.1-0.6% |

EXAMPLE 5

| | |
|---|---|
| H$_2$O | 31-42% |
| Cellosize QP 15000 | 0.1-0.6% |
| Nalco 7SJ-013 | 0-0.4% |
| Nopcocide N96 | 0.1-0.6% |
| Nalco 6SJ-899 | 6-12% |
| TiO$_2$ | 3-9% |
| PFA | 30-40% |
| Fibreglass flakes or strands | 5-10% |
| UCAR Latex 5000 | 7-16% |
| Texanol | 0.2-0.7% |
| Colloidal Silica 1050 | .1-.5% |
| Dowicil 75 | 0.1-0.6% |

EXAMPLE 6

| | |
|---|---|
| H$_2$O | 24-32% |
| TiO$_2$ | 3-6% |
| PFA | 30-40% |
| Fibreglass flakes or strands | 5-10% |
| UCAR Latex 5000 | 12-17% |
| Colloidal Silica 1034A | 3-6% |

EXAMPLE 7

| | |
|---|---|
| H$_2$O | 30-40% |
| Cellosize QP 15000 | 0-0.5% |
| Tamol 731 (25%) | 0-5% |
| Nopcocide N96 | 0-0.9% |
| Nopco NXZ | 0.3-1% |
| TiO$_2$ | 2-10% |
| PFA | 30-40% |
| Fibreglass flakes | 5-10% |
| UCAR Latex 5000 | 10-20% |
| Texanol | 0-0.9% |
| Colloidal Silica 1034A | 1-5% |
| Dowicil 75 | 0-0.9% |

Instead of fibreglass flakes or fibres, other inert inorganic material can be used.

EXAMPLE 8

| | |
|---|---|
| H$_2$O | 31.5-40.5% |
| Tamol 731 | 0.64-0.98% |
| Nopcocide N96 | 0.16-0.30% |
| Nopco NXZ | 0.62-0.82% |
| Dowicil 75 | 0.16-0.8% |
| TiO$_2$ R900 | 6.1-8.2% |
| PFA | 24.5-31.5% |
| Amorphous silica 1240 | 24.5-31.5 |
| AMP 95 | 0.36-0.64% |
| Texanol | 0.85-0.97% |
| Igepal CO-630 | 0.26-0.41% |
| UCAR Latex 5000 | 24-31% |
| Colloidal Silica | 2.5-3.6% |

EXAMPLE 9

| | |
|---|---|
| H$_2$O | 8-12% |
| Cellosize 15000 | 0.3-0.6% |
| Tamol 731 | 0.3-0.6% |
| Dowicil 75 | 0.4-0.6% |
| Pulp (paper or fibreglass flakes) | 5.5-8.6% |
| Nopcocide N96 | 0.2-0.5% |
| Nopo NXZ | 0.3-0.6% |
| TiO$_2$ R900 | 3.5-5.5% |
| UCAR Latex 5000 | 10-13% |
| Amorphous Silica | 28-32% |
| PFA | 28-32% |
| AMP 95 | 0.2-0.5% |
| Tricresyl Phosphate | 0.4-0.8% |
| Sodium Silicate | 2.5-4.5% |

In the foregoing examples all of the percentages are by weight.

The fire retardant composition in accordance with the present invention can be conveniently produced in a rotary mixer such as that commonly used in making paint. The water, dispersing agent, antifoaming agent and preservative are introduced in the mixer and mixed for about five minutes at a speed of for example 3,000 RPM. The speed is then reduced to about 1900 RPM and the pigment, pulverized fly ash and other solids that are included such as fibreglass flakes or strands are introduced and mixed for about twenty minutes. The speed of the mixer is again reduced to about 1200 RPM and the binder and plasticizer are added and mixed for about five minutes. The speed is kept at about 1200 RPM and any remaining constituents such as sodium silicate, colloidal silica and Dowicil 75 are added while continuing the mixing for another ten minutes. If a thicker composition, for example for mastic or composition board, is being produced, the speed of the mixer is appropriately reduced according to the thickness and viscosity of the composition.

When used as a paint, the fire regardant composition in accordance with the present invention is applied in any convenient manner, for example by brushing, dipping or spraying. Preferably two or more coats of the composition are applied in order to increase the protection afforded by the fire resistant properties of the composition. If a color other than that of the composition is desired, a finish coat of the desired color is applied. The finish coat is preferably of a water base paint.

When the composition is to be used as a mastic, less water is used in order to provide a composition of appropriate thickness and viscosity. The mastic composition may be sprayed onto wood or steel beams or other surfaces to provide a protective coating which is relatively thick, for example $\frac{1}{4}"-\frac{1}{2}"$ thick. If desired, a foaming agent can be added to the composition in order to provide intumescence when subjected to heat thereby further increasing the fire resistance of the composition.

When composition board or similar material is to be produced, the fire retardant composition in accordance with the present invention is mixed with a suitable filler and serves as a binder. For maximum fire resistance, it is desirable to use as the filler a non-combustible material such as fibreglass. However, the composition in accordance with the present invention can also be used with organic materials such as wood strands, chips or fibres. By reason of the fire retardant properties of the composition in accordance with the present invention, the resulting composition material has substantial fire resistance despite the organic filler. If it is desired to make composition board of lower density, a foaming agent is added to the composition.

The composition in accordance with the invention has been shown by tests to have effective fire retarding characteristics. In one test that has been conducted, wood blocks measuring approximately 4"×5"×¾" in dimensions were given two coats of paint made in accordance with the invention. A hole was provided near one corner of each block so that the block could be suspended by a wire. While thus suspended the block was dipped in gasoline and then ignited. When the gasoline had burned off, it was found that the blocks were not effected except for slight smoke streaking from the burning gasoline.

In a further test, a mastic made in accordance with Examiner 6 was applied approximately ¾" thick to one side of a wood block approximately 4"×5"×¾". After the mastic had been allowed to cure for four days, the block was suspended in a vertical position from a rack and the flame of a propane torch was applied to the center of the mastic coated side for three minutes. Small flames appeared from a central portion of the surface for a few seconds but then went out after which the surface glowed a dull red from the heat of the torch flame. When the torch was removed, the surface quickly cooled and where the torch flame had been applied there was a coating of light gray powder which could be brushed off. Other than this the fire retarding covering did not appear to be affected and there was no evidence of any effect on the underlying wood. The covering did not blister or in any way become separated from the wood base.

By reason of its fire retarding properties, the composition in accordance with the present invention is susceptible of wide use not only as a paint or mastic coating but also as a binding agent for composition board and other molded or cast products. Moreover, by making use of fly ash which is otherwise a waste material, the invention materially improves the ecology.

While examples of compositions in accordance with the present invention are herein given, it will be understood that substitutions may be made for certain constituents for example binders, dispersants, antifoaming agents and preservatives and that various additives may be included for example to increase shalflife. Thus the invention is in no way limited to the given examples.

What is claimed is:

1. A fire retardant coating composition consisting essentially of:

| | |
|---|---|
| finely pulverized fly ash | 24%–50% |
| a binder consisting essentially of low viscosity vinyl acrylic type emulsion polymer having the properties of being stable and compatible with fire retardant ingredients and of forming a film which is tough, flexible and resistant to cracking, has outstanding permanence, durability and binding capacity and is flame resistant, smokeless and free of emission of toxic vapors when heated, said binder being selected from the group consisting of UCAR Latex 5000 and RHOPLEX AC-234 | 7%–31% |
| Water | 8%–48% |
| Fine Fibreglass Flakes of Fibre | 0%–10% |
| Inorganic Pigment | 0%–10% |
| Low Foaming Dispersing Agent | 0%–5% |
| Water Captible Defoamer | 0%–10% |
| Plasticizer selected from the group consisting of 2,2,4-trimethyl-1,3 pentanediol monoisobutyrate and tricresyl phosphate | 0%–1% |
| Thickner consisting essentially of hydroxyethyl cellulose | 0%–1% |
| Drying Agent | 0%–6% |
| Water Soluble Preservative | 0%–1% |
| Compatible Fungicide | 0%–1% |
| 2-amino-2-methyl-1-propanol to control the pH of the composition and inhibit corrosion of metal surfaces to which the composition is applied | 0%–1% |
| Amorphous Silica | 0%–32% |
| Surfactant consisting essentially of nonylphenoexy-poly(ethyleneoxy ethanol | 0%–1% |

2. A fire retardant coating composition according to claim 1, in which said fly ash has such fineness as to pass through a 180 mesh screen.

3. A fire retardant coating composition according to claim 1, further containing 5% to 10% of fine fibreglass flakes.

4. A fire retardant coating composition according to claim 1, further containing 5% to 10% of fine fibreglass fibre.

5. A fire retardant coating composition according to claim 1, further containing 2% to 10% of inorganic pigment.

6. A fire retardant paint consisting essentially of:

| | |
|---|---|
| Water | 31.5 to 40.5% |
| Tamol 731 (25%) | 0.64% to 0.98% |
| Nopcocide N96 | 0.16% to 0.30% |
| Nopco NXZ | 0.62% to 0.82% |
| Dowicil 75 | 0.16% to 0.80% |
| TiO$_2$ R900 | 6.1% to 8.2% |
| Pulverized fly ash | 24.5% to 31.5% |
| Amorphous Silica | 24.5% to 31.5% |
| AMP 95 | 0.36% to 0.64% |
| Texanol | 0.85% to 0.97% |
| Igepal CO-630 | 0.26% to 0.41% |
| UCAR Latex 5000 | 24.5% to 31.5% |
| Colloidal Silica | 2.5% to 3.6% |

7. A fire retardant mastic composition consisting essentially of:

| | |
|---|---|
| Water | 8% to 12% |
| Cellosize 15000 | 0.3% to 0.6% |
| Tamol 731 (25%) | 0.3% to 0.6% |
| Dowicil 75 | 0.4% to 0.6% |
| Fibreglass strands | 5.5% to 8.6% |
| Nopcocide N96 | 0.2% to 0.5% |
| Nopco NXZ | 0.3% to 0.6% |
| TiO$_2$ R900 | 3.5% to 5.5% |
| UCAR Latex 5000 | 10% to 13% |
| Amorphous Silica | 28% to 32% |
| Pulverized fly ash | 28% to 32% |
| AMP 95 | 0.2% to 0.5% |
| Tricresyl phosphate | 0.4% to 0.8% |
| Sodium Silicate | 2.5% to 4.5% |

* * * * *